United States Patent [19]

Mayo et al.

[11] Patent Number: 4,936,746
[45] Date of Patent: Jun. 26, 1990

[54] COUNTER-ROTATION PITCH CHANGE SYSTEM

[75] Inventors: Millard G. Mayo, Weathersfied, Conn.; Edward H. Kusiak, Longmeadow, Mass.; Philip E. Barnes, West Hartford, Conn.; Paul A. Carvalho, Westfield, Mass.

[73] Assignee: United Technologies Corporation, Hartford, Conn.

[21] Appl. No.: 259,369

[22] Filed: Oct. 18, 1988

[51] Int. Cl.$^5$ ............................................. B64C 11/44
[52] U.S. Cl. ...................................... 416/46; 416/128; 416/130
[58] Field of Search ....................... 416/33, 46, 127–130

[56] References Cited

U.S. PATENT DOCUMENTS

| 2,394,299 | 1/1941 | Friedrich | 416/129 |
| 2,761,517 | 9/1956 | Detamore et al. | 416/127 X |
| 2,804,154 | 8/1957 | Treseder et al. | 416/49 X |
| 2,876,848 | 3/1959 | Detamore et al. | 416/127 |
| 3,900,274 | 8/1975 | Johnston et al. | 416/155 |
| 4,563,129 | 1/1986 | Pagluica | 416/129 |
| 4,591,313 | 5/1986 | Miyatake et al. | 416/129 X |
| 4,688,995 | 8/1987 | Wright et al. | 416/127 |
| 4,728,261 | 3/1988 | Wright et al. | 416/127 |
| 4,738,589 | 4/1988 | Wright | 416/127 |
| 4,750,862 | 6/1988 | Barnes et al. | 416/46 |
| 4,753,572 | 6/1988 | Kusiak | 416/46 |

FOREIGN PATENT DOCUMENTS

| 2145777 | 4/1985 | United Kingdom | 416/127 |
| 2173863 | 10/1986 | United Kingdom | |

Primary Examiner—Robert E. Garrett
Assistant Examiner—Hoang Nguyen
Attorney, Agent, or Firm—Lloyd D. Doigan

[57] ABSTRACT

A propeller system has a pair of hub assemblies driven in counter-rotation, each hub assembly having a mechanical pitch change actuator, each actuator being provided with a pitch lock that rotates simultaneously with the motion of the actuator to allow the actuator to set propeller blade pitch, but locks the propeller blade positionally when not rotating simultaneously with the actuator, and a differential for transmitting a pitch change signal across a rotating gap between the two hub assemblies and for providing power to a means for providing the pitch change signals. A pair of motors provide the rotative signal to set the pitch of the blades in each hub assembly. One of the pair of motors drives the actuator towards high pitch and the other motor drives the actuator towards low pitch. A synchronizer coordinates the signals of the first and second motors so that a pitch lock moves simultaneously with the actuator.

21 Claims, 4 Drawing Sheets

COUNTER-ROTATION PITCH CHANGE SYSTEM

TECHNICAL FIELD

This invention relates generally to a propeller pitch change system and more particularly to a counter-rotating propeller pitch system.

BACKGROUND ART

Typically, variable pitch propeller systems for aircraft include: a plurality of propeller blades extending radially from a central hub, an engine for rotating the hub and propeller blades, and a pitch actuating system that pivots the propeller blades about their longitudinal axes to vary the angle (pitch) of the blades with respect to the approaching air flow. The pitch actuating system is generally housed within the hub.

Dual acting pitch actuation systems generally include a pitch lock. In the event of a malfunction of the pitch actuation system, the pitch lock prevents overspeed of the engine by preventing the blades from retarding to a lower pitch.

Some propeller systems have a pair of hubs which rotate counter to each other across what is known as a rotation gap. Each hub mounts a plurality of blades thereto. In some counter-rotation prop-fans, one hub may hold as many as six to ten blades and the other hub may hold form six to to twelve blades. The pitch of the blades in one hub may differ from the pitch of the blades in the other hub due to the different aerodynamic forces each hub may encounter.

The controls for both hubs are generally maintained on one side of the rotation gap. As a result, a signal to change the pitch of the blades on the other side of the rotation gap must be sent across the rotation gap between the two hubs.

Wright et al U.S. Pat. No. 4,688,995 entitled "Propeller Module For An Aero Gas Turbine Engine" shows a system by which a pitch change mechanism transmits a pitch change signal across a rotating gap by means of a spindle which passes through a planet gear of a reduction gearbox. U.K. patent application No. 2,145,777 entitled "Aircraft Propeller System" shows a similar system to Wright in which a pitch change signal is transmitted across the rotating gap by means of a thrust bearing which passes through a planet gear of a gearbox. U.S. Pat. No. 2,394,299 shows a system which utilizes a planetary pitch change mechanism for simultaneously adjusting the pitch of the blades of each hub.

Other pitch change systems for counter-rotation propellers are sought, and it is to this end that the present invention is directed.

DISCLOSURE OF INVENTION

According to the invention, a propeller system has: a pair of hubs driven in counter-rotation across a rotation gap, each hub having a pitch change actuator for setting the pitch of blades mounted to each hub; a means for providing a pitch change signal to at least one of the pitch change actuators, as required, to change the pitch of the blades of at least one of the hubs, as required; and, a differential for transmitting the pitch change signal across the rotating gap between the two hubs and for providing power to the means for providing a pitch change signal to the pitch change actuators.

According to a feature of the invention, each actuator is provided with a pitch lock that rotates simultaneously with the motion of the actuator to allow the actuator to set propeller blade pitch, but locks the propeller blade positionally when not rotating simultaneously with the actuator.

According to a feature of the invention, the means for providing a pitch change signal is comprised, for each hub, of a pair of motors which provide a signal to set the pitch of the blades. One of the pair of motors drives the actuator towards high pitch and the other motor drives the actuator towards low pitch. A synchronizer coordinates the first and second motors so that a pitch lock moves simultaneously with the actuator.

The differential transmits a rotative force across the rotating gap to power the motors and transmits the pitch change signal back across the rotating gap to the actuator and the pitch lock. The differential advantageously tends to urge the blades toward pitch lock or feather in all failure modes.

Other features and advantages of the present invention will be apparent from the specification and claims and from the accompanying drawings which illustrate and embodiment of the invention.

BEST MODE FOR CARRYING OUT THE INVENTION

Figures 1, 2:
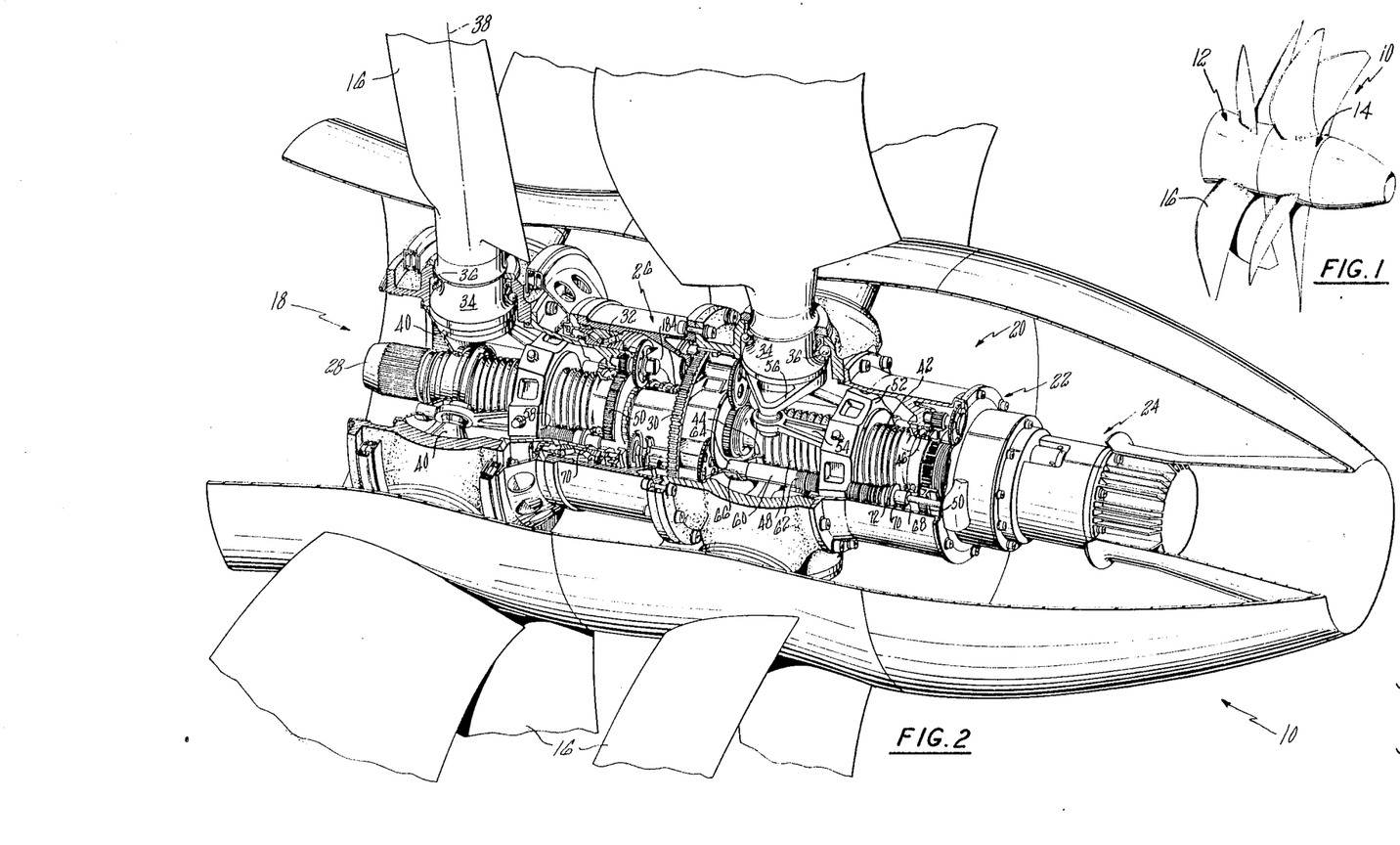
FIG. 1 is a perspective view of an aircraft counter-rotation, "pusher" propeller employing an embodiment of a pitch change system of the present invention.
FIG. 2 is a perspective, partly broken away, cross-sectional view of the pitch change system as shown in FIG. 1.

An embodiment of a pusher aircraft counter-rotation propeller 10 employing the concepts of the present invention is illustrated in FIGS. 1 and 2. An engine (not shown) rotates a forward hub assembly 12 and an aft hub assembly 14 via a gearbox (not shown) located across a rotation gap from the forward hub assembly. As is well known, the forward hub assembly and the aft hub assembly rotate counter to each other. A plurality of radially extending propeller blades (hereinafter blades) 16 are mounted within each hub assembly for rotation therewith.

The counter-rotation propeller system has several major portions; the forward hub assembly 12, the aft hub assembly 14, a forward pitch change system 18, an aft pitch change system 20, a hydraulic drive system 22, an electronic controller 24 (shown generally in FIG. 2), and a differential 26.

The Hubs

The forward and aft hub assemblies 12, 14 transmit engine torque to the blades 16. The engine gearbox (not shown) drives the forward hub assembly via gearing (not shown) and the aft hub assembly via a quilled shaft 28 which includes a drive spline 30. The quilled shaft passes through the forward pitch change system 18 (see FIGS. 2 and 4) and is fixedly attached to the aft hub assembly via the drive spline such that rotation of the shaft 28 rotates the aft hub assembly. The aft hub assembly is mounted upon the forward hub assembly for rotation relative thereto by main bearings 32.

Each blade 16 is mounted at a root portion 34 thereof to a hub assembly by bearings 36 which allow the blade to pivot about a longitudinal axis 38. Each pitch change system attaches to the root end 40 of the blade to pivot the blade thereby setting the blade pitch, as will be discussed infra.

The Pitch Change System

Referring to FIG. 2, the details of the pitch change system is shown. Each pitch change system is similar to the pitch change system disclosed in U.S. Pat. No. 4,753,572 entitled "Propeller Pitch Change Actuation System" which is commonly owned by the Assignee herein Such patent is hereby incorporated by reference.

A ball screw 42 is mounted within each hub assembly for rotational movement relative thereto A journal bearing 44 and a ball bearing 46 mount each ball screw to each hub assembly so that the ball screw is able to rotate relative thereto. The ball screw has a helical race 48 to accommodate balls (not shown), as will be discussed infra. A toothed surface 50 extends radially outwardly at an aft end of each ball screw, as will be discussed infra.

A ball nut 52 has a helical race (not shown) matching the helical race 48 in each ball screw 42. Rotation of each ball screw translates the ball nut longitudinally. The balls travel through the helical races at half the speed of the races and exit at a trailing end of the ball nut as is known in the art. A return tube (not shown) in each ball nut picks up the balls at the trailing end of each ball nut and recirculates them into a leading end, thereby keeping a train of balls within the races for continuous operation.

The ball nut 52 of each hub assembly is attached by a connecting rod 54 to an eccentric pin 56 mounted to the root end 40 of each blade mounted in that hub assembly. Each ball nut has a threaded portion (shown generally at 58) oriented parallel to the ball screw. The threaded portion acts as a pitch lock, as will be described infra.

A pitch lock screw 60 has an exterior, threaded portion 62 for rotation within the threaded portion 58 of each ball nut 52. The forward end portion 64 of each pitch lock screw is rotatably mounted within a hub assembly projection 66. The aft portion 68 of each pitch lock screw is mounted to a bulkhead 70 (See also FIG. 5). A shoulder 72 mounted closely to the outboard end portion of the pitch lock screw limits the pitch lock screw from moving longitudinally towards aft (i.e., toward low pitch). A first gear 74 (see FIGS. 4, 5, and 6) is fixedly attached to the pitch lock screw as will be described infra.

Figure 5:
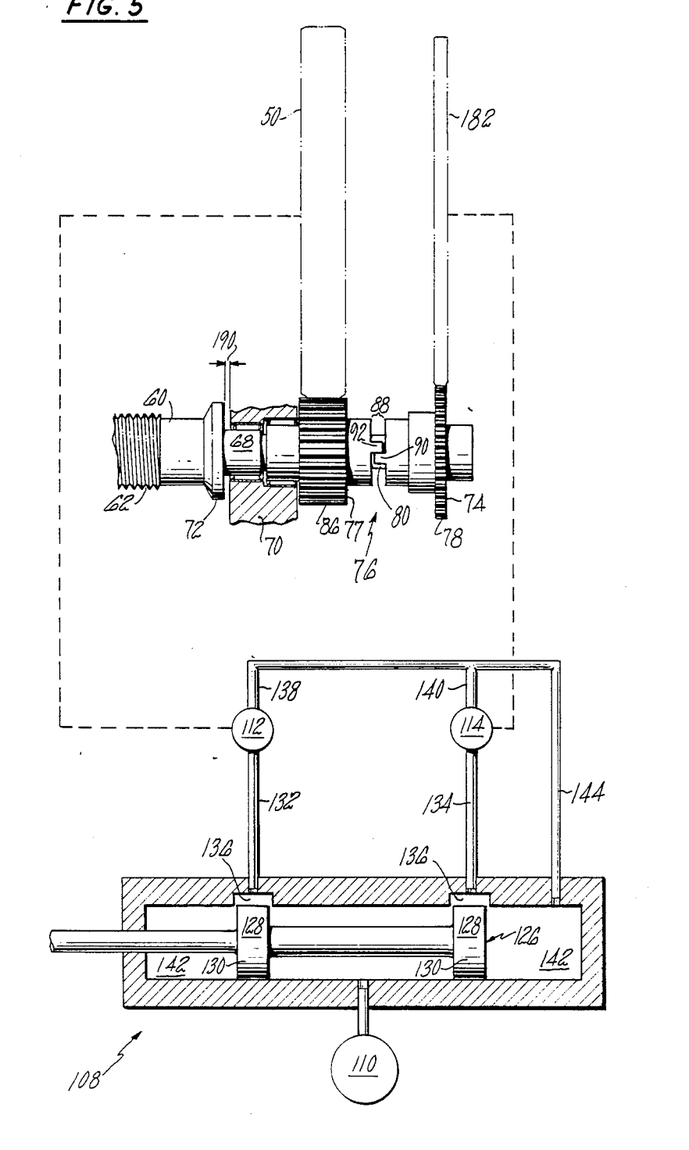
FIG. 5 is a schematic view, partly broken away, of a hydraulic control of FIG. 3; and, FIG. 6 is a perspective, exploded view of a synchronizer of FIGS. 4 and 5.
Figure 6:
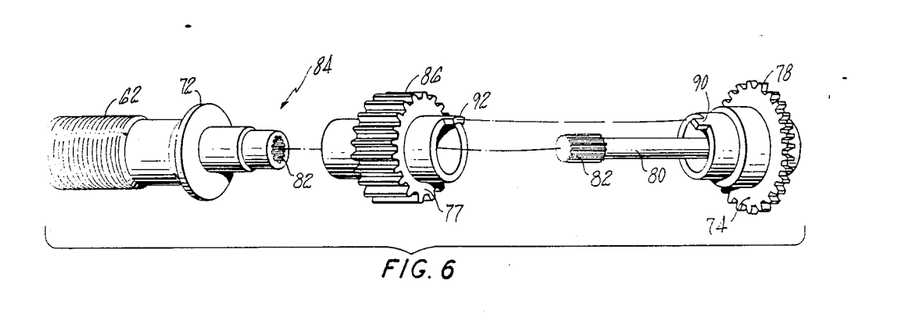

Each pitch control system has a synchronizer 76. Referring to FIGS. 5 and 6, each synchronizer is comprised of the first gear 74 and a coaxially arranged second gear 77. The first gear has a toothed surface 78 as will be discussed infra. A shaft 80 having a splined end portion 82 is fixedly attached to the first gear. The shaft extends forward towards the pitch lock screw 60. The splined end portion cooperates with a cavity 82 within the aft end of the pitch lock screw such that the pitch lock screw rotates with the rotation of the first gear.

The second gear 77 surrounds the shaft 80 and the aft end 84 of the pitch lock screw 60 for rotation relative thereto. The second gear has a toothed surface 86 which meshes with the toothed surface 50 of each ball screw 42.

The first and second gears 74, 77 are separated by a gap 88. A first lug 90 extends from the first gear into the gap towards the second gear. The second gear has a second lug 92 which extends into the gap towards the first gear. The first and second gears are arranged such that rotation of either of the first and second gears by the hydraulic drive system 22 causes the lugs to contact each other as will be discussed infra.

The Hydraulic Drive System

As in U.S. Pat. No. 4,753,572, each pitch change system of the present invention is driven by a pair of hydraulic motors 112, 114 or 146, 148. As will be discussed, one of the motors drives the ball screw 42 of a pitch change system towards high pitch. The other of the pair of motors drives the ball screw towards low pitch. The synchronizer 76 of each pitch control system ensures that the pitch lock screw 60 rotates with the translation of the pitch nut 52 caused by the motors.

Figure 3:
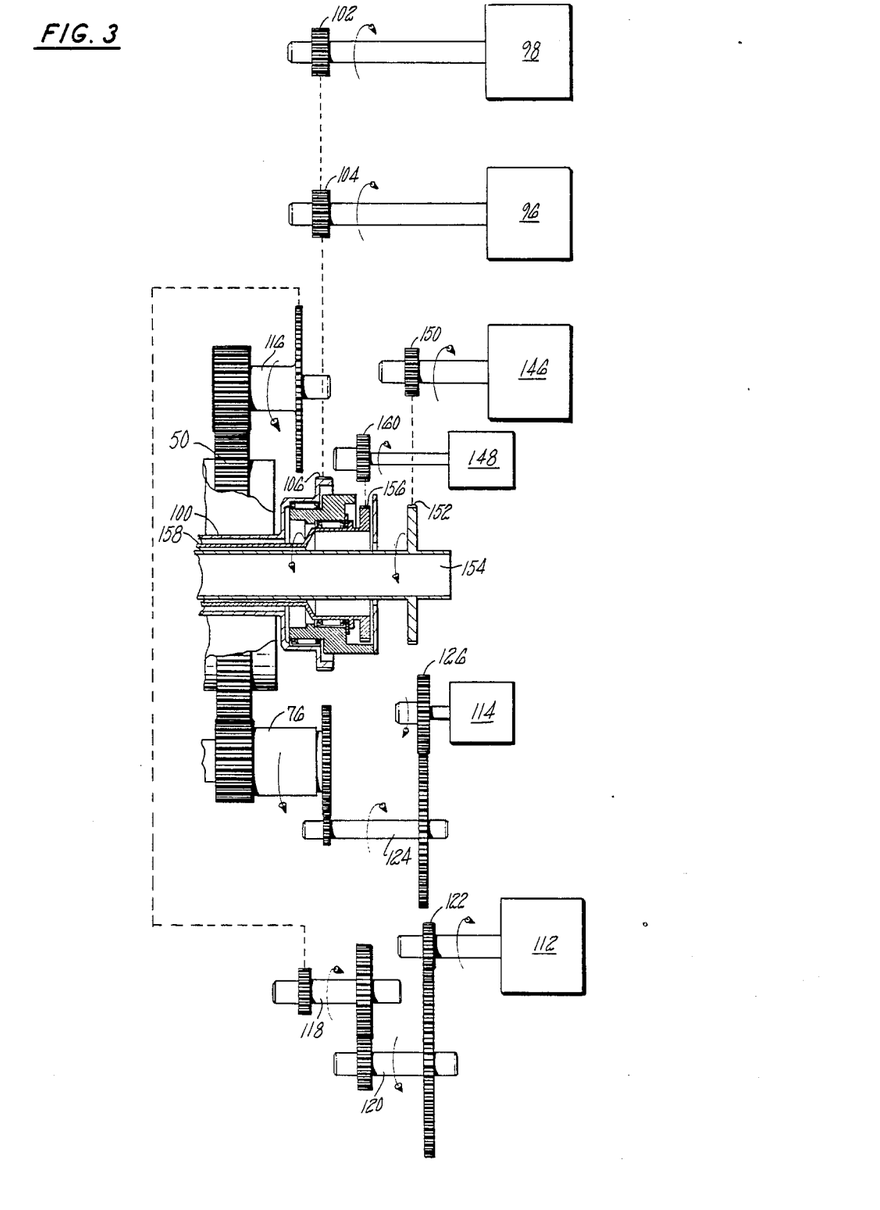
FIG. 3 is a perspective view, partly broken away, of a driving system of the pitch change system as shown in FIG. 2.

Referring to FIG. 3, the motors 112, 114 and/or 146, 148 are powered by a main pump 96 and/or a standby pump 98. Power is input to the pumps via the differential 26 (as will be discussed infra) and a first torque tube 100. The first torque tube engages gear 102 and gear 104 via toothed surface 106. The gears, in turn, power the main pump and standby pump, respectively.

The pumps provide hydraulic fluid to a valve 108 (see FIG. 5) via valving (shown schematically at 110 of FIG. 5). An example of valving typical for supplying the fluid to the valve is shown in FIGS. 6 and 7 of Barnes et al U.S. Pat. No. 4,750,862 entitled "Modular Propeller Blade Pitch Actuation System" such patent being commonly owned by the Assignee herein and being hereby incorporated by reference.

Referring back to FIG. 3, the pitch control system 20 in the aft hub assembly 14 is controlled by an aft increase pitch motor 112 and an aft decrease pitch motor 114. The toothed surface 50 of the aft ball nut 42 is rotated by the aft increase pitch motor 112 via a first idler gear 116, a second idler gear 118, a third idler gear 120 and gear 122. The toothed surface 50 of the aft ball screw 42 is rotated by the aft decrease pitch motor via synchronizer 77 (which will be discussed infra), a fourth idler gear 124, and gear 126.

The pitch control system 18 in the forward hub assembly 12 is controlled by a forward increase pitch motor 146 and a forward decrease pitch motor 148. The increase pitch motor transmits its rotational force via gear 150 to the toothed surface 152 of a second torque tube 154. The decrease pitch motor transmits its rotational force to the toothed surface 156 of a third torque tube 158 via gear 160. The second and third torque tubes transmit rotational signals to the differential 26. The torque tubes 100, 154 and 158 pass through the aft pitch change system 20 to the hydraulic drive system 22.

It should be noted that the rotational directions indicated for the output of the various motors is the direction of rotation required to drive the blades toward high pitch (i.e. towards feather).

Referring to FIG. 5, a schematic depiction of the hydraulic drive system is shown. A control valve 108 directs pressurized hydraulic fluid from the main or standby pumps 96, 98 to either the increase or decrease pitch motor 112, 114, as described above (or motors 146, 148 as a similar valve provides hydraulic fluid to those motors), to drive the blade towards high or low pitch via schematically shown increase pitch gear gear train 113 or decrease pitch gear train 115, as will be discussed infra. A spool 126 within the control valve and having lands 128, each land having an exterior surface 130, directs fluid to either hydraulic motor through line 132 or line 134. Lines 132 and 134 each have an inlet 136 which is slightly larger in area than the exterior surface of the lands. Because the inlets are larger than the lands, fluid leaks to preload the hydraulic motors so that the lugs 90, 92 are in contact to be driven synchronously as will be discussed infra. After passing through either hydraulic motor, the fluid is directed via lines 138 and 140 to a reservoir 142 via line 144.

The Differential

Figure 4:
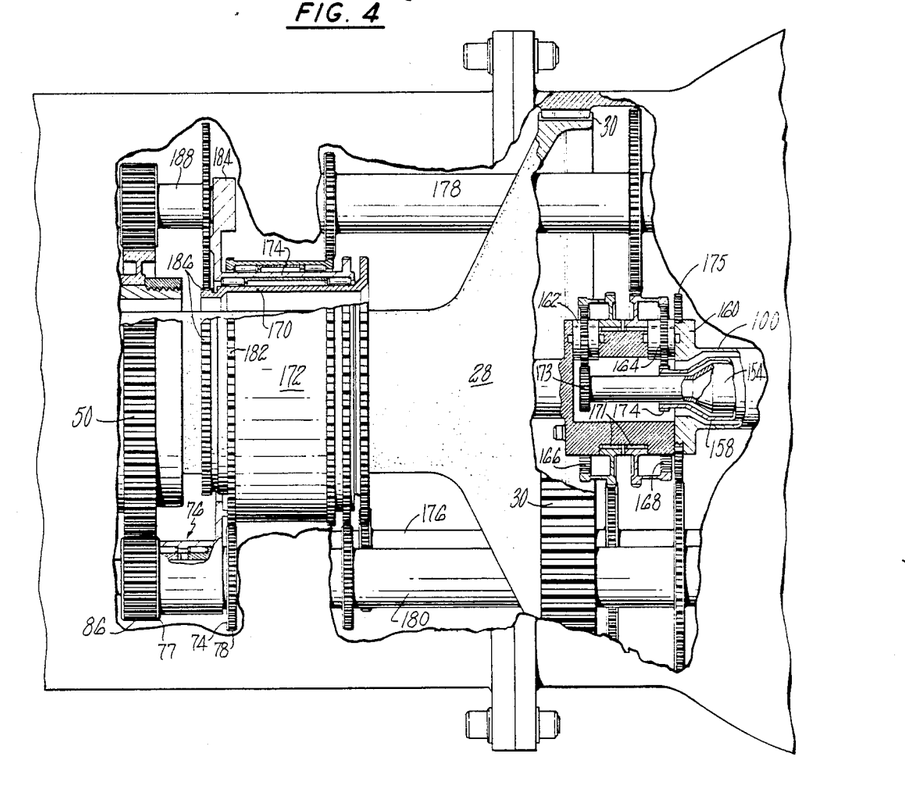
FIG. 4 is a perspective view, partly broken away, of a differential of the pitch change system of FIG. 2.

The differential transmits rotational force to the pumps 96, 98 and rotational pitch change signals from the forward increase and decrease pitch hydraulic motors 146, 148 across a "rotating gap" between the forward and aft hub assemblies. A rotating gap represents the areas between the hub assemblies where relative rotation takes place. A rotating gap also exists between the forward hub assembly and the engine (not shown). Referring to FIG. 4, the differential consists of a cage 160, an increase planetary gear 162, a decrease planetary gear 164, a increase ring gear 166, a decrease ring gear 168, a increase drum gear 170, a decrease drum gear 172, a power drum gear 174, an increase idler 176, a decrease idler 178, and a power idler 180.

The cage is mounted at its forward end (not shown but see FIG. 4) within the drive shaft 28 for rotation relative thereto. The aft end of the cage is fixedly attached to the first torque tube 100. The increase and decrease ring gears 166, 168 are mounted for rotation relative to the cage by bearings 171. The increase ring gear 166 is driven by a sun gear 173 attached to the second torque tube 154. The decrease ring gear 168 is driven by a sun gear 174 attached to the third torque tube 158. The cage has a toothed surface 175 extending radially outwardly therefrom.

The increase idler 176, the decrease idler 178 and the power idler 180 extend through the drive shaft 28 to attach to the increase, decrease and power drum gears, 170, 172, and 174 respectively. As such, the idlers rotate with the drive shaft. The idlers are also mounted for rotation relative to the drive shaft. The drum gears are arranged about the drive shaft for rotation relative thereto.

The decrease drum gear 172 has a toothed surface 182 which drives the toothed surface 78 of the first gear 74 of the forward synchronizer 77. The power drum gear 174 is fixedly attached to the forward hub assembly 12 via a projection 184. The power drum gear rotates with the forward hub assembly and transmits such rotation through the power idler to the cage 160 via the toothed surface 175 and first torque tube 100. As noted above, the first torque tube then provides power to the main and standby pumps 96, 98. The increase drum gear has a toothed surface 186 attaching to the toothed surface 50 of the forward ball screw via idler gear 188.

Operation

In operation, a signal to adjust blade pitch is directed to a relevant valve 108 by the controller. Only one valve is shown for ease of illustration, but it is understood that each pair of hydraulic motors is controlled by one of the valves. It is further understood that the pitch of the blades in one hub assembly may be changed independently of the pitch of the other hub assembly as required.

If it is desired to move the blades 16 of the hub assemblies toward high pitch, the spool of each valve 108 is directed to the left as shown in FIG. 5. Hydraulic fluid is directed by each individual valve to the forward increase motor 146 and aft increase pitch motors 112. In the aft hub assembly, the increase pitch hydraulic motor 112 rotates the aft ball screw via the first idler 116, the second idler 118 and third idlers 120, and the toothed surface 50. In the forward hub assembly, the increase pitch motor 146 rotates the forward ball screw via the second torque tube 154, sun gear 173, planet gear 162, increase ring gear 166, increase idler gear 176, increase drum gear 170, idler gear 188 and toothed surface 50.

As a result of the rotation of the ball screws 42, the ball nuts 52 moves longitudinally forward. As the ball nut moves longitudinally forward, the blades 16 are rotated towards high pitch via the connecting rod 54 and the eccentric pin 56.

While each ball screw is being rotated, the second gear 77 of each synchronizer 76 is being driven by the toothed surface 50. The second lug 92 engages the first lug 90 of the first gear 74 to rotate the first gear gear and concomitantly the pitch lock screw via the shaft 80. The gears are sized and synchronized so that the pitch lock screw rotates at the proper speed within the ball nut to maintain the pitch lock screw positionally within the hub assembly as the ball nut moves longitudinally.

If each pitch lock screw 60 does not rotate at the proper speed in relation to the movement of the ball nut 52, the pitch lock screw will move longitudinally with the ball nut. If the ball nut moves in the low pitch direction (i.e. towards aft) and the pitch lock is moving longitudinally therewith, the shoulder 72 abuts the hub assembly projection 70. Friction between the threaded portion 58 of the ball nut and the threaded portion 62 of the pitch lock screw prevents the ball nut from further longitudinal movement.

Conversely, if it is desired to move the blade toward low pitch, the spool 126 is directed to the right as shown in FIG. 5. Hydraulic fluid is directed to each individual valve to the forward and aft decrease pitch motors 148, 114. In the aft hub assembly, the decrease pitch hydraulic motor rotates the aft ball screw via the fourth idler 124, the synchronizer 76, and the toothed surface 50. The fourth idler drives the first gear 74 (see FIGS. 5 and 6) which rotates the pitch lock screw 60. The first lug 90 engages the second lug 92 of the second gear 77. The second gear engages the toothed surface 50 of the ball screw which rotates, moving the blades towards low pitch.

In the forward hub assembly 12, the decrease pitch motor 148 rotates the forward ball screw via the second torque tube 154, the decrease planet gear 162, decrease ring gear 166, decrease idler gear 176, decrease drum gear 170, the forward synchronizer 76 and the toothed surface 50. The forward synchronizer operates the same as the aft synchronizer to move the pitch lock screw and ball nut appropriately.

Should a malfunction occur such that the blades 16 begins to extract power from the airstream rather than absorb engine power, the power from the airstream tends to twist the blade towards low pitch. As the blades 16 move toward low pitch, the ball nuts 52 are induced to move through their connection to the blades by the connecting rods 54 and the eccentric pins 56. However, since the pitch lock screws 60 are not rotating simultaneously with the motion of the ball nuts, the pitch lock screws and ball nuts 52 move longitudinally aft until the shoulder 72 on the aft end portion of the pitch lock screws abut the hub assembly projections 70 When the shoulders abut the hub assembly projection, the ball nuts are prevented from further longitudinal motion, thereby locking the blades from moving further towards low pitch. Since the distance between the shoulder and the hub assembly projection (i.e., the "pitch gap" 190, see FIG. 5) is small, the blades will not move any appreciable amount toward low pitch.

In the steady state, the increase idler gear 176 and decrease idler gear 178 run, as a function of the relative rotation of the hub assemblies, in the same direction at the same revolution per minute. In order to move the blades toward high pitch (i.e. towards feather), the increase pitch motor is rotated to signal the increase idler gear (as noted above) to rotate at a slower relative revolutions per minute across the rotation gap. In order to move the blades towards low pitch, the decrease idler gear is rotated at higher relative revolutions per minute across the rotation gap. As a result of the orientation of the differential, if the differential becomes inoperative or seizes, the idler gears 176, 178 will tend to slow relatively (and drive the blades to high pitch) as opposed to speed up relatively (and drive the blades to a dangerous low pitch condition).

The first and second gears 74, 77 of the synchronizer rotate in the counterclockwise direction towards high pitch and in the clockwise direction towards low pitch. If any component in the increase pitch gear train 113 (i.e. for the aft hub assembly, aft increase motor 112, first idler gear 116, second idler gear 118, and third idler gear 120; and for the forward hub assembly, forward increase motor 146, second torque tube 154, increase planet gear 162, increases ring gear 164, increase idler 176, increase drum gear 170 and idler 188) fails to operate, the blades will pitch lock. Because the decrease pitch gear train 115 (i.e. for the aft hub assembly, aft decrease motor 114, idler 124 and synchronizer 76; and for the forward hub assembly, forward decrease motor 148, third torque tube 158, decrease planet gear 164, decrease ring gear 168, decrease idler 178, decrease drum gear 172, and synchronizer 76) has no hydraulic load (i.e. is not sending a rotative signal) and the increase gear train is inoperative, the second gear 77 of the synchronizer 76 rotates in a clockwise direction as the blades normally twist towards low pitch. As the blades twist towards low pitch, the ball nut 52 is moved longitudinally aft forcing the counterclockwise rotation of the ball screws (and the clockwise rotation of the second gear via the toothed surface 50). The second lug 92 rotates away from the first lug 90. As a result the pitch lock screw 60 can not rotate simultaneously with the rotation of the ball screw because lug 92 does not drive the first gear 74. The pitch lock screw moves longitudinally with the ball nut until the shoulder 72 of the pitch lock screw abuts the bulkhead 70 thereby locking the blades from going to low pitch.

Similar to the increase pitch gear train, if any component in the decrease pitch gear train fails to operate, the blades in each hub pitch lock. Because the decrease gear train is inoperative, the second gear 77 rotates in a clockwise direction as the blades normally twist towards low pitch. The second lug 92 rotates away from the first lug 90. As above, the pitch lock screw moves longitudinally with the ball nut until the shoulder 72 of the pitch lock screw 60 abuts the bulkhead 70 thereby locking the blades from going to low pitch.

However, because of the orientation of the lugs, the blades may still be driven to feather if the decrease pitch train fails. As the ball screw is driven in a clockwise direction towards high pitch, the second gear 77 of the synchronizer is driven in a counterclockwise direction such that the second lug 92 engages the first lug 90 to rotate the pitch lock screw 60 via the first gear 74. As the pitch lock is rotating simultaneously with the motion of the ball nut, pitch lock is not encountered.

It should be understood that the invention is not limited to the particular embodiments shown and described herein, but that various changes and modifications may be made without departing from the spirit and scope of the invention as defined by the following claims.

Having thus described the invention, what is claimed:

1. A pitch change system for a counter-rotating propeller having a first hub assembly and a second hub assembly, each of said hub assemblies mounting a plurality of variable pitch propeller blades thereto, said first hub assembly and said second hub assemblies being separated by a rotation gap, said system comprising:
first pitch change means for changing the pitch of said blades mounted to said first hub assembly,
second pitch change means for changing the pitch of said blades mounted to said second hub assembly,
signal means for providing a signal to at least one of said first pitch change means and said second pitch change means, as required, to change said pitch of said blades of at least one of said first hub assembly and said second hub assembly, as required, said signal means being located with said second hub assembly, and
differential means for providing power to said signal means as a function of the relative rotation between said first and second hub assemblies and for transmitting said signal to said first pitch change means across said rotation gap as required.

2. The pitch change system of claim 1 wherein said signal means comprises;
a first signal means for providing a rotational signal to said first pitch change means to change the pitch of said blades mounted to said first hub assembly, and
a second signal means for providing a rotational signal to said second pitch change means to change the pitch of said blades mounted to said second hub assembly.

3. The pitch change system of claim 2 wherein each of said first and second signal means comprises;
a first motor for providing a first rotational signal to change the pitch of the blades of a hub assembly towards high pitch, and
a second motor for providing a second rotational signal to change the pitch of the blades of a hub assembly towards low pitch.

4. The pitch change system of claim 3 further comprising;
synchronizing means for coordinating said first rotational signal and said second rotational signal directed to a hub assembly such that upon a failure said pitch change system, said pitch change means of a hub assembly prevents said blades from retarding to a lower pitch.

5. The pitch change system of claim 1 wherein said differential means comprises;

a cage attaching to said signal means for transmitting power to said signal means.

6. The pitch change system of claim 5 wherein said cage means further comprises;
   a high pitch means for transmitting a high pitch signal from said signal means to said first pitch change means across said first rotation gap, and
   a low pitch means for transmitting a low pitch signal from said signal means to said first pitch change means across said first rotation gap.

7. The pitch change system of claim 6 wherein said high pitch signal and said low pitch signal are rotative.

8. A pitch change system for a counter-rotating propeller having a first hub assembly and a second hub assembly, each of said hub assemblies mounting a plurality of variable pitch propeller blades thereto, said first hub assembly and said second hub assemblies being separated by a rotation gap, said system comprising:
   first means for changing the pitch of said blades mounted to said first hub assembly and for preventing said blades from undesirably retarding to a lower pitch,
   second means for changing the pitch of said blades mounted to said second hub assembly and for preventing said blades from undesirably retarding to a lower pitch,
   third means for providing a signal to at least one of said first means and said second means, as required, to change said pitch of said blades of at least one of said first hub assembly and said second hub assembly, as required, said third means being located within said second hub assembly, and
   differential means for providing power to said third means as a function of the relative rotation between said first and second hub assemblies and for transmitting said signal to said first means across said rotation gap as required.

9. The pitch change system of claim 8 wherein said third means comprises;
   a first signal means for providing a rotational signal to said first means to change the pitch of said blades mounted to said first hub assembly, and
   a second signal means for providing a rotational signal to said second means to change the pitch of said blades mounted to said second hub assembly.

10. The pitch change system of claim 9 wherein each of said first and second signal means comprises;
    a first motor for providing a first rotational signal to change the pitch of the blades of a hub assembly towards high pitch, and
    a second motor for providing a second rotational signal to change the pitch of the blades of a hub assembly towards low pitch.

11. The pitch change system of claim 10 further comprising;
    synchronizing means for coordinating said first rotational signal and said second rotational signal directed to a hub assembly such that upon a failure said pitch change system, said first means and said second means prevent said blades from retarding to a lower pitch.

12. The pitch change system of claim 8 wherein said differential means comprises;
    a cage means rotating as a function of the relative rotation between the first and second hub assemblies and attaching to said third means for transmitting power thereto.

13. The pitch change system of claim 12 wherein said cage means further comprises;
    a high pitch means for transmitting a high pitch signal from said third means to said first means across said first rotation gap, and
    a low pitch means for transmitting a low pitch signal from said third means to said first means across said first rotation gap.

14. The pitch change system of claim 13 wherein said high pitch signal and said low pitch signal are rotative.

15. The pitch change system of claim 13 further comprising;
    synchronizing means for coordinating said high pitch and said low pitch signals directed to a hub assembly such that upon a failure said pitch change system, said first means and said second means prevent said blades from retarding to a lower pitch.

16. A pitch change system for a counter-rotating propeller having a first hub assembly and a second hub assembly, each of said hub assemblies mounting a plurality of variable pitch propeller blades thereto, said first hub assembly and said second hub assemblies being separated by a rotation gap, said system comprising:
    first pitch change means for changing the pitch of said blades mounted to said first hub assembly and for preventing said blades from undesirably retarding to a lower pitch,
    second pitch change means for changing the pitch of said blades mounted to said second hub assembly and for preventing said blades from undesirably retarding to a lower pitch,
    signal means for providing a signal to at least one of said first pitch change means and said second pitch change means, as required, to change said pitch of said blades of at least one of said first hub assembly and said second hub assembly, as required, said signal means being located with said second hub assembly, and
    differential means for providing power to said signal means and for transmitting said signal to said first pitch change means across said rotation gap as required, said differential means being mounted for rotation within said second hub assembly, said differential means having,
       means for transmitting a relatively high speed rotative signal from said signal means to said first pitch change means to decrease the pitch of said blades in said first hub, and
       means for transmitting a relatively low speed rotative signal from said signal means to said first pitch change means to increase the pitch of said blades in said first hub, said differential means being adapted to transmit said relatively low speed rotative signal upon a failure of said differential means or said signal means.

17. The pitch change system of claim 16 wherein said differential means further comprises;
    a cage rotating as a function of the relative rotation between the first and second hub assemblies and attaching to said signal means for transmitting rotative power thereto.

18. The pitch change system of claim 17 wherein said differential means further comprises;
    a first gear train passing through said cage for transmitting said relatively high speed rotative signal therethrough, and a second gear train passing through said cage for transmitting said relatively low speed rotative signal therethrough.

19. The pitch change system of claim 18 wherein said differential means further comprises;
   said first gear train comprising a first star gear within said cage, a first planet gear rotating with said cage and rotated by said first star gear, a first ring gear rotating about said cage and rotated by said first planet gear, a first idler gear extending toward said first hub assembly and rotated by said first ring gear, and a first drum gear, said first drum gear rotating said first pitch change means toward high pitch at said relatively low speed, and
   said second gear train comprising a second star gear within said cage, a second planet gear rotating with said cage and rotated by said second star gear, a second ring gear rotating about said cage and rotated by said second planet gear, a second idler gear extending toward said first hub assembly and rotated by said second ring gear, and a second drum gear said second drum gear rotating said first pitch change means toward low pitch at said relatively high speed.

20. The pitch change system of claim 6 wherein said cage means further comprises:
   means for activating said high pitch means to transmit a high pitch signal upon a failure of said differential means.

21. The pitch change system of claim 13 wherein said cage means further comprises:
   means for activating said high pitch means to transmit a high pitch signal upon a failure of said differential means.

* * * * *